United States Patent [19]

Majstorovic

[11] Patent Number: 5,870,687

[45] Date of Patent: Feb. 9, 1999

[54] VEHICLE PERFORMANCE ANALYZER EMPLOYING AN ACCELEROMETER-BASED USER INTERFACE

[76] Inventor: Jovo Bozidar Majstorovic, 1728 Wellesley Ave., Los Angeles, Calif. 90025

[21] Appl. No.: 633,155

[22] Filed: Apr. 16, 1996

[51] Int. Cl.[6] ........................................... G01P 7/00
[52] U.S. Cl. ........................ 701/37; 701/35; 73/116; 73/117.2; 73/117.3
[58] Field of Search .................... 345/7, 8, 123, 345/31, 16; 73/116, 117.3, 765, 865.3, 503, 514.33, 1.38; 702/150; 340/669; 701/35, 29, 30

[56] References Cited

U.S. PATENT DOCUMENTS

| | | | |
|---|---|---|---|
| 3,853,002 | 12/1974 | Peck | 73/324 |
| 4,694,687 | 9/1987 | Bonin et al. | 73/116 |
| 4,908,767 | 3/1990 | Scholl et al. | 364/453 |
| 5,269,187 | 12/1993 | Hanson | 73/340 |
| 5,499,182 | 3/1996 | Ousborne | 701/35 |
| 5,517,183 | 5/1996 | Bozeman, Jr. | 340/669 |

*Primary Examiner*—Jacques H. Louis-Jacques
*Assistant Examiner*—Arthur Donnelly
*Attorney, Agent, or Firm*—Philip H. Haymond

[57] ABSTRACT

A vehicle performance analyzer incorporating an acceleration-measuring method and apparatus to use an accelerometer to both measure vehicle performance and assist the user in entering the user-defined parameters or data. This use of an accelerometer to enter data can be widely applied to other electrical devices. The circuit and method uses an accelerometer to cycle discreet user-defined data for selection by the user. This accelerometer-based user interface to enter data is widely applicable to other electrical devices.

16 Claims, 3 Drawing Sheets

VEHICLE PERFORMANCE ANALYZER EMPLOYING AN ACCELEROMETER-BASED USER INTERFACE

BACKGROUND OF THE INVENTION

This invention relates generally to acceleration-measuring apparatus and more particularly to a vehicle performance analyzer using an accelerometer to both measure vehicle performance and assist the user in entering the user-defined parameters or data. More broadly, this invention relates to a method and apparatus employing that method, to be used with any electrical device requiring the user to enter alpha-numeric data.

The invention is a configuration for an electrical system employing an accelerometer, in this case a circuit using an accelerometer to measure the performance of a vehicle. The invention also uses the accelerometer to assist in entering discreet user-defined data. Discreet user-defined data is a particular numeric, alphabetic or alpha-numeric value. Alternatively, any other electrical device using a microprocessor can be equipped with the accelerometer-based user interface of this invention to be used in aiding the entry of discreet user-defined data into that electrical device.

Discreet user-defined data are those specific parameters or other specific values displayed to the user that a user chooses to enter into an microprocessor-controlled electrical device to cause it to thereafter perform in a given fashion. This is to distinguish this type of data from the data that is continuously "entered" into an electrical device in the ordinary course of its function, e.g. the user of a heart monitor device continuously "enters" data into the machine's microprocessor, although indirectly, by action of a heart beat, but any discreet user-defined data is generally entered by a physician prior to using the device heart monitor to monitor the heartbeat.

Many electrical and electronic devices, both analog and digital, require that the user enter user-defined data to calibrate or adjust or prepare the device for use. Almost all electrical and electronic devices are limited to using a button, switch or knob to program (adjust or calibrate) them. This usually requires the user to turn dials or repetitively push buttons to cause the device to acquire the desired value. For instance, a digital watch or clock requires the user to first push a mode button to set the time, then the user must set the hours by either repetitively pushing a button or by holding down a button as the watch or clock cycles through the different time settings. The user then switches to another mode and repeats the button pushing sequence to adjust the setting for minutes, followed by the same laborious and time-consuming procedure for setting the day and the date. The user then finally resets the mode of the time-keeping device to disengage user-defined data entry to set the clock with the buttons.

Analog devices also require that a user adjust them with a knob or button. Many radios and television sets require the user to turn an analog knob to adjust the frequency of reception or alter the volume. With a radio or television having digital user-defined data entry to adjust the frequency of reception or alter the volume, the user must either enter several digits or have a single button preset to a given setting.

This problem becomes all the more prominent with the ongoing miniaturization of electronic products because the buttons and switches have become proportionately smaller. It has become more and more difficult to adjust miniature radios and television sets.

The chief embodiment of this invention described herein is a vehicle performance analyzer. The same problem of entering data is encountered by automobile enthusiasts who want to know what the performance characteristics of their automobiles are, such as horsepower produced, the fastest time in reaching 0–60 miles per hour or the fastest time that can be achieved in completing a quarter mile.

In order to calculate power evolved by a vehicle, for instance, the user must enter the weight of the vehicle, horsepower in watts being calculated as Ac×V×Mass, where Ac is acceleration, V is velocity and M is mass. Vehicle power is typically measured in horsepower, one horsepower equals 746 watts. The mass (weight) of the vehicle must be entered into the vehicle performance analyzer in order to measure the horsepower. Currently the automobile enthusiast must laboriously enter user-defined data into a vehicle performance analyzer in much the same fashion that a user must enter user-defined data into a watch or clock above.

It is known in the prior art to employ the use of a vehicle performance analyzer device which includes an accelerometer to determine and measure the performance characteristics of a automobile. This same type of device can be also used on any moving vehicle, such as boats and airplanes. It is also known in the prior art to employ a microprocessor coupled with one or more accelerometers to measure the acceleration performance of a vehicle.

Scholl, U.S. Pat. No. 4,908,767, describes the use of an accelerometer and microprocessor to determine acceleration in the nominal, forward and vertical directions of a vehicle.

Bonin, et al., U.S. Pat. No. 4,694,687 describes a system having a capacitive accelerometer for detecting changes in acceleration and for producing a digital count value proportional to these changes. This apparatus takes the digital count value obtained from the accelerometer and calculates the amount of acceleration experienced by the vehicle.

Peck, U.S. Pat. No. 3,853,002 teaches a vehicle performance analyzer, wherein circuitry electrically connected to the vehicle's standard electrical system to produce a first electrical signal having a frequency proportional to the vehicle velocity and a second electrical signal proportional to the rate of change of the first signal. The two electrical signals are multiplied together to determine acceleration and this acceleration amount is used to ascertain the power of the vehicle.

Devices of the type taught in the Scholl, Bonin and Peck patents require that the user repetitively and laboriously enter discreet user-defined data, such as the vehicle's weight, by first selecting a data-input mode in a fashion similar to that described for the digital watches, above.

SUMMARY OF THE INVENTION

The present invention is also directed to making electronic devices in general more easy to program and in particular to satisfying the above need to have a more easily programmable vehicle performance analyzer. It is a method and apparatus than can be adapted to allow virtually any electronic device which employs an accelerometer, and that can be held or moved by the user, to be similarly programmed.

The circuit and the method described herein uses an accelerometer to control the cycling and display of potential, candidate data values. The user observes the displayed values and selects one or more data values to enter into the program controlling the electrical device.

A programmable circuit is an electrical circuit that has a memory and processing capability an can execute a plurality of instructions controlling the circuit. A common device used to execute instructions is a microprocessor.

A user programmable circuit, is a programmable circuit that additionally incorporate mode selection means, defined below, which allow a user to input specific user-defined data or parameters that alter the way in which the circuit executes its program. The mode selection means places the user programmable circuit in a data entry mode and provides a means for entering the data. The Scholl and Bonin patents are examples of user programmable circuits.

A microprocessor is well known in the art. It is an integrated circuit that contains a arithmetic-logic unit, a control unit, and sometimes the floating-point unit of a computer's central processing unit. While the inventor believes that a microprocessor is the best circuitry to be used for this invention, he also recognizes it would be obvious to one of ordinary skill in the art to build an equivalent logic circuit for the programmable circuit, avoiding the use of a microprocessor. As used herein microprocessor means includes both integrated circuit microprocessors as well as circuits made from transistors forming logic gates alone.

It should be noted that in some applications microprocessor means do not accept discreet user defined data. For example, an electronic ignition system commonly used on automobiles employs microprocessor means yet does not accept a user-defined value; it is programmed once and thereafter responds in a pre-programmed manner to the user's manipulating the accelerator pedal of the automobile, in combination with given other sensor-derived parameters such as engine temperature and air density. In this instance the microprocessor means are part of a programmable circuit, but not a user programmable circuit.

Mode selection means as used herein refers to the combination of software and hardware which allows a user to enter discreet user-defined data values into the microprocessor means. In the example of the digital clock or watch, above, the user presses a button to put the watch or clock into programmed modes to accept data to enter for hours, minutes and days. In the example of a personal computer, well known in the art, the mode selection means comprises the subroutines of a software program that places the personal computer in a state to accept data in combination with a keyboard or "mouse" pointing device, both well know in the art.

As used herein display means refers to any apparatus which informs the user that a value has been obtained, including but not limited to alpha-numeric digital displays, a dial, a sound indicating that a certain value has been obtained, a single indicator light or vibrations, all well know in the art.

A programmable acceleration-sensing circuit is comprised of an accelerometer, sending signals to a user programmable circuit. The vehicle performance analyzer embodied in the Bonin patent, incorporated herein as an example of a type of programmable acceleration-sensing circuit. Where the user inputs user-defined data solely by pushing buttons to be used thereafter by the microprocessor to control the circuit. Peck teaches a programmable acceleration-sensing circuit uses circuitry electrically connected to the vehicle's existing electrical system to produce a first electrical signal having a frequency proportional to the vehicle velocity and a second electrical signal proportional to the rate of change of the first signal. The two electrical signals are multiplied together to determine acceleration and this acceleration amount is used to ascertain the power of the vehicle.

The present invention can be used to configure a programmable acceleration-sensing circuit to use the accelerometer itself to aid in entering the discreet user-defined data, creating an accelerometer-based user interface.

An accelerometer-based user interface is comprised of microprocessor means, and has mode selection means using a single or multiple-axis accelerometer to send a signal to the microprocessor means, which in turn sequentially displays pre-defined data values on the display means. The user observes the displayed values and selects one or more desired discreet user-defined values from one of the displayed values and enters it into the microprocessor means to control the microprocessor means.

The pre-defined data values are a set of one or more data values that have been entered and stored in the microprocessor means prior to the user selecting one or more of them as discreet user-defined data to be entered. The data is cycled in such a fashion that some or all of the pre-defined data values are displayed in some previously-defined sequence, for instance 0–9999 or A–Z, or another set of symbols, or in any other sequence, e.g. 0-A-993-Q-Z-12--Σ-Π-3.

A single-axis accelerometer measures acceleration in one direction, along its axis. Therefore, moving a single-axis accelerometer in a direction normal to this axis would result in a reading of no acceleration at all. As the single-axis accelerometer is moved in a line closer to the direction of its axis, that vector component of the motion in line with the accelerometer's axis is detected.

In the present invention microprocessor means are programmed to use the output of the accelerometer signal to cycle through potential values to be entered, one of which is chosen by the user to be used to program the microprocessor means itself. The user puts the electrical circuit having an accelerometer-based user interface in a mode for accepting discreet user-defined data and, physically holding or otherwise moving the invention, tips it upwards or downwards with respect the accelerometer's axis of the direction in which the accelerometer is measuring acceleration. This tipping motion causes the accelerometer to read an increase in acceleration or deceleration as the acceleration of the earth's gravity comes in line with the axis of measurement of the accelerometer. The microprocessor is programmed to increase or decrease the displayed value in response to the signal generated by the accelerometer and, optionally, to cycle through the different values at a rate in proportion to the amount of acceleration or deceleration indicated by that signal: with greater measured acceleration, the resulting stronger signal causes a the circuit to cycle progressively more rapidly through the candidate values.

When the accelerometer-based user interface displays the discreet value desired by the user, the user signals the circuit to enter this value as user-defined data to program the microprocessor.

As used herein the term accelerometer refers to any of the wide variety of devices available that can sense acceleration. There are many different types of accelerometers commercially available that are suitable for application to a programmable circuit. Many commercially available accelerometers are available, such as mechanical (pendulum), electromechanical (e.g., piezoelectric, piezoresistive or strain gauge) or electronic (capacitive discharge) element. All of these are acceleration measuring devices. Acceleration-sensing microstructures embodied on silicon chips could also be used and they have been suggested. For instance, U.S. Pat. No. 4,711,128 issued to Boura discloses an acceleration sensor formed by micro machining a fine monocrystal wafer. The sensor comprises a flat mobile mass suspended above the rest of the structure by means of two thin parallel strips situated on each side of the mass. The mass comprises at least one mobile capacitive plate which is disposed between two other capacitive plates which are not part of the suspended microstructure but are fixed on the structure. The mobile plates are charged to a voltage relative to the stationary plates. When the sensor is subjected to an acceleration, the mobile plates move relative to the fixed plates causing a change in capacitance between the mobile plates and each of the fixed plates. The change in capacitance is a direct indication of the distance of movement of the fixed plate which, in turn, is a measurement of the acceleration.

Accordingly, it is an object and advantage of the invention to provide a new and novel method for entering discreet user-defined data into any programmable or adjustable analog or digital electrical circuit by incorporating an accelerometer into that circuit and connecting it to the programmable element of the circuit using an accelerometer-based user interface.

It is also an object and advantage of the invention to provide a new and novel circuit for entering user-defined data into any programmable or adjustable analog or digital electrical circuit by incorporating an accelerometer into that circuit and connecting it to the programmable element of the circuit using an accelerometer-based user interface.

In the embodiment described below, it is another object of the invention to provide an improved vehicle performance analyzer employing this accelerometer-based user interface.

These and other features, aspects and advantages of the present invention will become better understood with regard to the following description, appended claims and accompanying drawings detailing the preferred embodiment.

DETAILED DESCRIPTION AND PREFERRED EMBODIMENT

Figure 1:
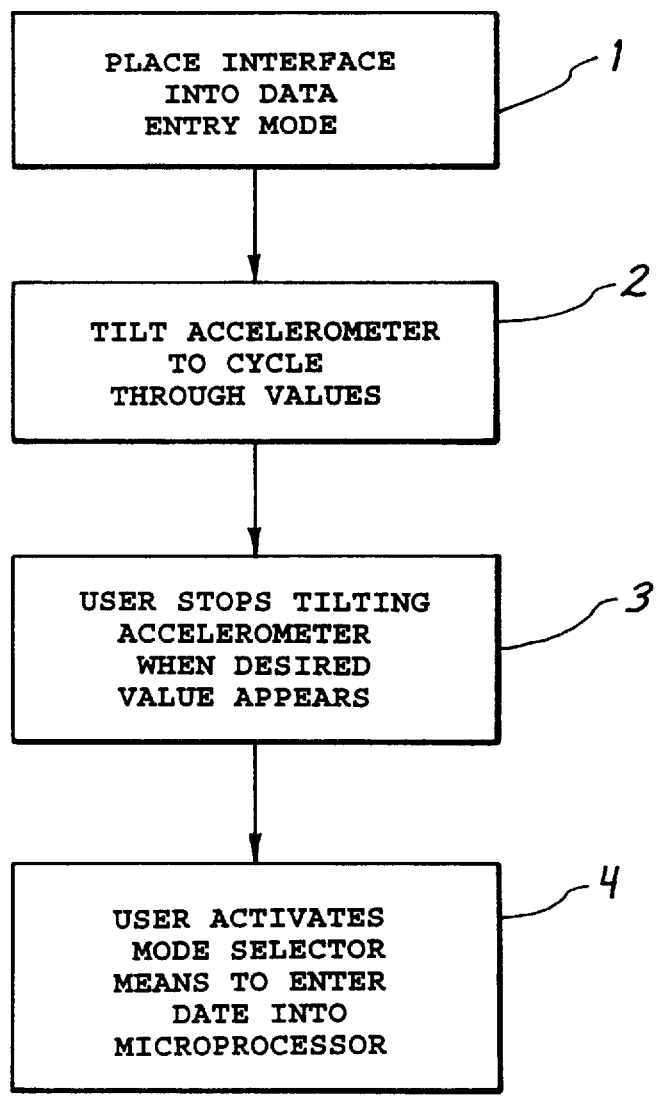
FIG. 1 is a flowchart of the method of the accelerometer-based user interface.

Referring now to the drawings in general and particularly to FIG. 1, there is shown a flowchart of the steps of the method of the present invention:

The first step (1) is to put an accelerometer-based user interface circuit into a mode to cycle through candidate data in response to the user's tipping the device in an axis of the accelerometer.

The second step (2) comprises the user tilting or otherwise moving the accelerometer in the axis of its measurement upwards or downwards from the direction of gravity.

This causes the accelerometer to generate a signal in response to the acceleration of the earth's gravity. The acceleration of gravity near the surface of the earth exerts a constant acceleration of about 9.8 m/sec/sec (32 ft/sec/sec) on the accelerometer.

The inventor contemplates that the accelerometer could as well be physically detached from the rest of the circuit, perhaps communicating a signal to the circuit by radio or light waves, or simply semi-detached by wire. All that matters is that a the accelerometer is in communication with the rest of the circuit.

In step (3) the user stops tilting the accelerometer-based user interface after it displays the desired value on the display means.

Step (4) The user uses the mode selection means to input the desired value.

Figure 2:
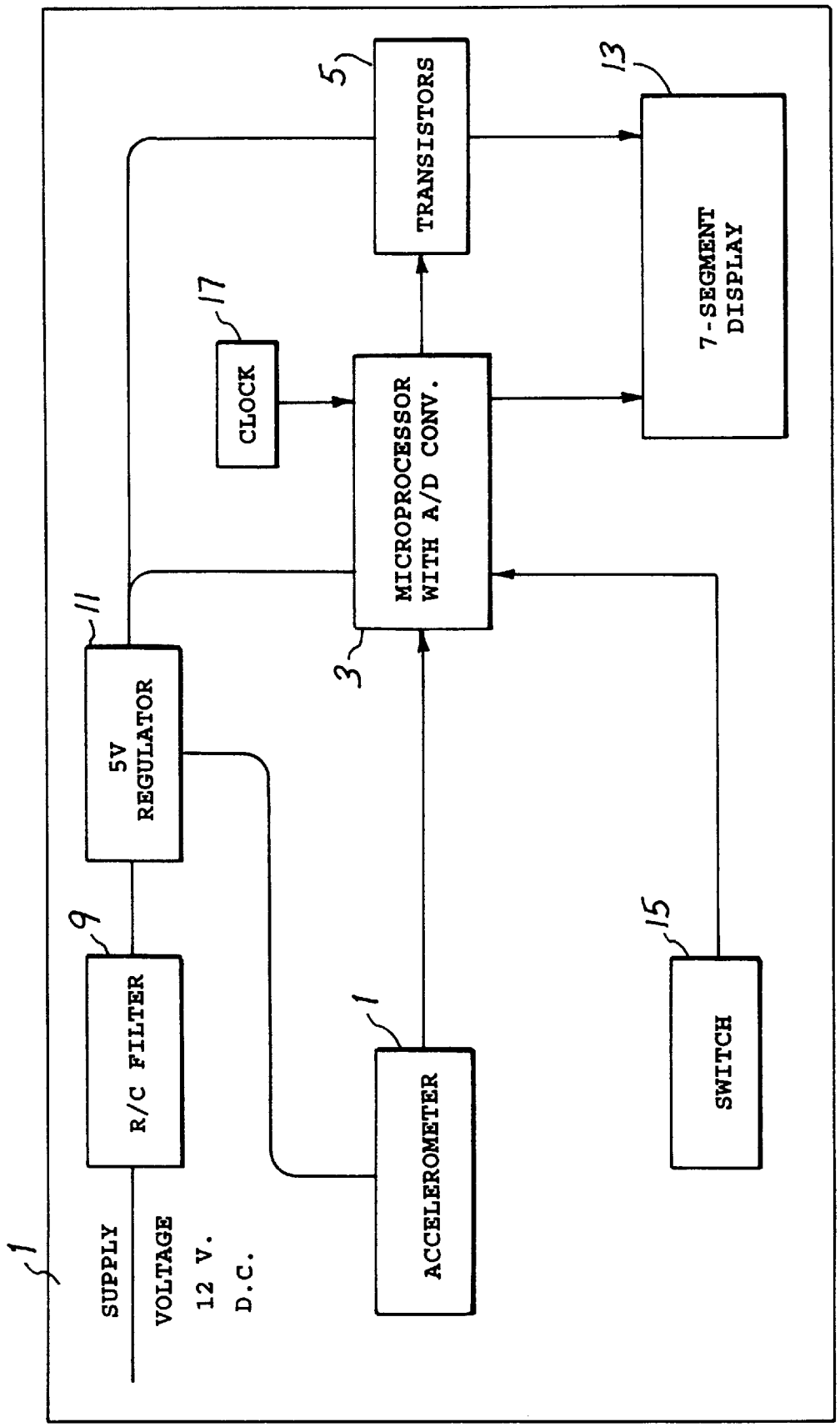
FIG. 2 is a schematic view of the circuit of the best mode of the preferred embodiment of the invention, a vehicle performance analyzer.

Referring now to FIG. 2, a block circuit diagram depicting the preferred embodiment of a vehicle performance analyzer is shown:

Accelerometer 1 is in communication with and sending signals to Microprocessor 3. The microprocessor is also in communication with and sending signals to Transistors 5. The power source for the Transistors, Microprocessor and Accelerometer are is a filtered 12-volt DC power source 7. This power source is obtained by tapping the power of a common automotive cigarette lighter using a cigarette lighter adapter of a type well known in the art.

The 12-volt power source is first filtered through an RC filter 9 to filter out electronic noise from the vehicle engine, the inventor has found that a 30 ohm, 1 watt resistor and 300 micro-farad electrolytic capacitor is optimal for this purpose. The power then passes through a standard LM7805, 5-volt positive voltage regulator 11, to regulate and decrease the voltage supply to the Transistors 5, Microprocessor 3 and Accelerometer 1 to a uniform 5 volts. Both Microprocessor 3 and Transistors 5 are in communication with and send signals to control the 4-digit, 7-segment Display 13. The Microprocessor is timed from a signal generated by Crystal Oscillator 17. Microprocessor mode selection is controlled by Switch 15.

The Accelerometer 1 is a capacitive silicon accelerometer model available from Texas Instruments Automotive Sensors Division of Attleborough, Mass. The Transistors 5 are an NPN transistor array made by Harris of Melbourne, Fla.; they are designed to provide enough current to drive the 4-digit, 7-segment Display 13.

The Microprocessor 3 of choice is an Microchip Technology Inc., of Chandler, Ariz., model PIC16C71 04/P 8-bit microcomputer having 1K of Programmable ROM (PROM) and an 8-bit A/D converter.

The preferred Switch 15 is a 5-position push/slide switch. This switch can be slid to position OFF, 1 and 2. The switch can also be in positions 1' (by pressing the button while at position 1) and 2' (by pressing the button while at position 2).

The Display 13 is a common 4-digit, 7-segment multiplexed common source LED (light-emitting diode) display, here model LFD 2216-20/P1 made by Logitech Electronics of Taipei, Taiwan.

All of the components in FIG. 2 are well known to those of ordinary skill in the art and the manner of assembling them according to the teachings of this patent is well understood by those of ordinary skill in the art. The inventor has found also that suspending the accelerator-based user interface vehicle performance analyzer with a bracket attached by suction cups to the inside of the windshield is both convenient and dampens ambient vibration from the vehicle to the vehicle performance analyzer.

The PROM is initially programmed to cause the microprocessor to become an accelerometer-based user interface for a Vehicle Performance Analyzer:

The ROM is initially programmed with a "ROM burner" device using an assembler language translator. An assembler language translator is used translate code into hexadecimal data to be burned into the microprocessor ROM. Moreover this particular microprocessor employs a RISC architecture to reduce the instruction set to the bare minimum, emphasizing the instructions used most of the time and optimizing them for the fastest possible execution. There are a wide variety of such microprocessors on the market, a wide variety of assembler languages and a wide variety of specific source codes that can be authored to carry out the functions required for the inventor's accelerometer-based user interface.

The Microprocessor is then programmed to provide a mode selection means for an accelerometer-based user interface incorporating subroutines that enter data or change subroutines depending on the current subroutine the device is in and the user data entry accomplished by placing the switch in one of its five positions.

Figure 3:
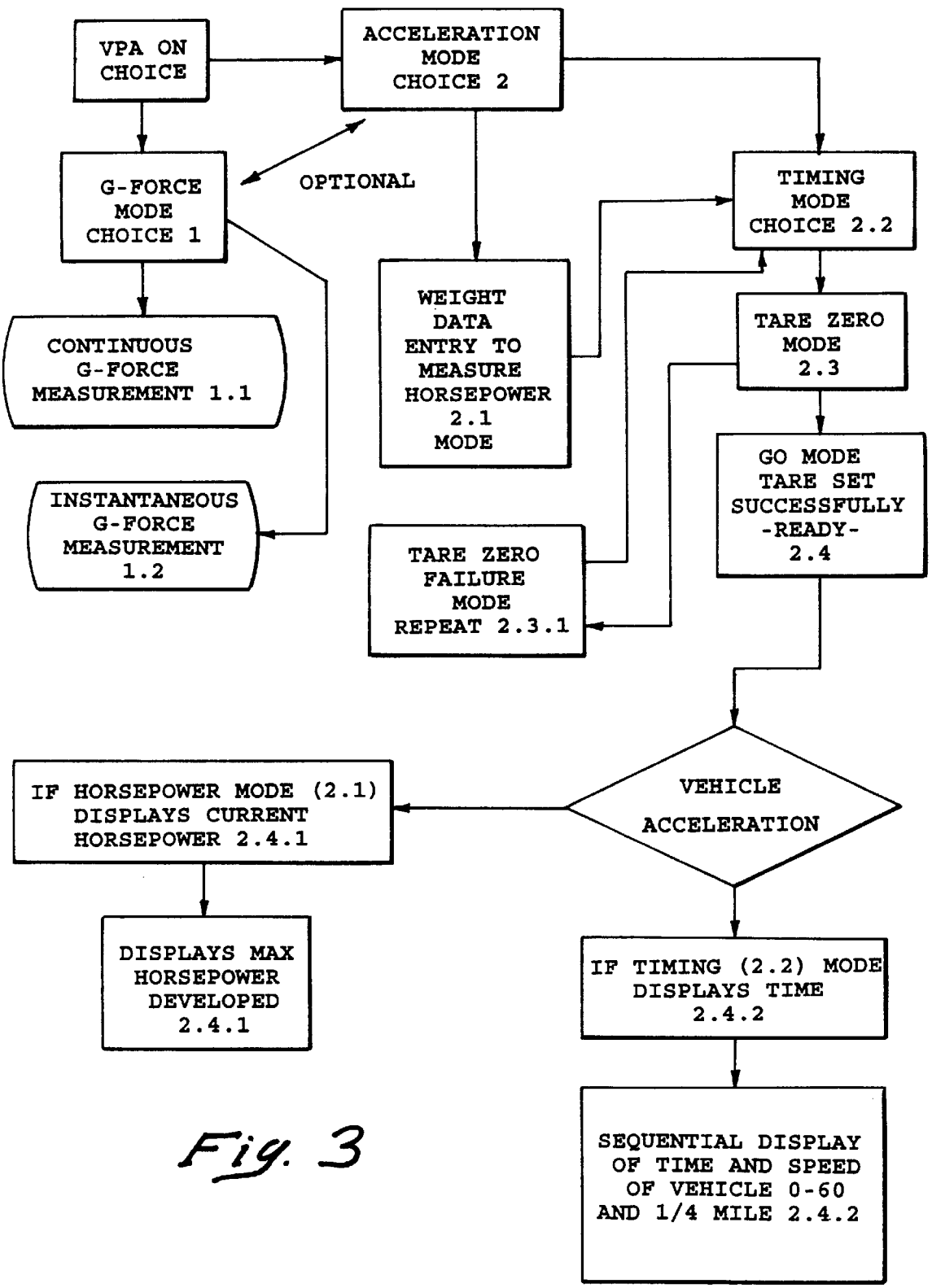
FIG. 3 is a flow chart of the of the programming steps used in the preferred embodiment.

Referring now to FIG. 3, a flow chart diagram is shown for programming the Vehicle Performance Analyzer having an accelerometer-based user interface.

The switch is slid from the OFF position to position 1, turning on the Vehicle performance analyzer. The microprocessor causes two options to alternately flash on the display, one to place it is the "G-force" mode 1, the other to place it in the "Acceleration mode" 2. There is provided an option also to switch between the two modes after making the initial choice.

G-force is a measure of acceleration where 1 G=the acceleration of gravity. The G-Force mode causes the accelerator-based user interface vehicle performance analyzer to measure acceleration in G-forces. The user now has the option of choosing, with the Switch, to measure either the Continuous G-Force, shown at 1.1 or the Instantaneous G-force, at 1.2 produced upon acceleration of the vehicle. A continuous G-Force is the maximum G-force obtained within a three-second period; instantaneous G-force is the actual-force being exerted at any given moment.

Alternatively after turning the accelerator-based user interface vehicle performance analyzer the user can choose option 2, the acceleration mode. From that mode the user can choose either the Horsepower measure mode, shown as 2.1, or the Timing Mode, shown as 2.2.

It is in this horsepower mode 2.1 that the microprocessor is used as an accelerometer-based user interface. It cycles numbers in response to the user tipping the accelerometer of the vehicle performance analyzer upwards or downwards towards the earth in its axis of measurement. For instance, when the user depresses and holds the switch, the accelerator-based user interface, being roughly level and roughly at zero, when tilted upwards the numbers being cycled climb sequentially. The more greater the angle of the tilt, the faster the displayed number climbs. Concomitantly, when the accelerator-based user interface is tilted downwards the numbers decrease (but not into negative numbers). The user observes the display and when the desired number is displayed, in this case the vehicle's weight in pounds, the user releases the switch to enter the number into the microprocessor. Optionally this mode can be equipped with a sub-mode (not shown) to halt at a displayed number and change it incrementally by one or a few numbers, using the switch, to "home in" on the desired displayed number. The user then presses the switch once to enter the displayed number.

The microprocessor has now been programmed with the vehicle's weight and returns to the timing mode 2.2.

Timing mode 2.2 will end in different modes depending on whether it was entered directly or through horsepower mode 2.1. In both cases though Timing mode 2.2 goes to Tare mode 2.3, wherein the microprocessor polls the accelerometer to measure its position relative to the ground. The microprocessor then calculates an offset for future calculations to compensate for the amount of tilt. If the accelerometer is too far out of tilt to compensate for by an offset (>0.06 G), the microprocessor will go to Tare Failure mode 2.3.1 and return to the Timing Mode 2.2 to attempt the Tare mode again.

Should the microprocessor complete the Tare Zero mode 2.3 successfully, it will proceed to GO mode 2.4. In this mode the user accelerates the vehicle and the vehicle performance analyzer takes its measurement.

If Horsepower mode 2.1 was initially selected, the vehicle performance analyzer will now measure and display the horsepower from moment to moment during acceleration, 2.4.1. When the acceleration declines after first reaching about 30 mph, the vehicle performance analyzer then displays the maximum horsepower developed during the acceleration episode, 2.4.1'.

If, on the other hand, Timing mode 2.2, was initially selected, the vehicle performance analyzer will now keep time 2.4.2. If the user continues to accelerate after 60 mph, the microprocessor will calculate and display quarter-mile elapsed time and speed at the quarter mile ("trap speed"); if the speed falls off after reaching 60 mph the microprocessor will calculate and display 0–60 mph speed and elapsed time. measure and display the horsepower from moment to moment during acceleration, 2.4.1. When the acceleration climbs after reaching about 30 mph, the vehicle performance analyzer then displays the maximum horsepower developed during the acceleration episode, 2.4.1'.

What is claimed is:

1. An accelerometer-based user interface circuit, comprising:

a) microprocessor means;

b) an accelerometer in communication with and sending a signal sensing acceleration to said microprocessor means;

c) display means receiving and displaying signals from said microprocessor means, d) mode selection means whereby said mode selection means causes said microprocessor means to cycle and display data values on said display means in response to the signal from said accelerometer and allows the user to enter one or more of the values.

2. The accelerometer-based user interface circuit of claim 1 wherein the microprocessor means stores data digitally.

3. The accelerometer-based user interface circuit of claim 1 wherein the mode selector means cycles the display of the sequence of pre-defined data values at a rate proportional to the angle of tilt of the accelerometer.

4. The accelerometer-based user interface circuit of claim 1 wherein the mode selector means displays a sequence of pre-defined data values in response to the tilt of the accelerometer in one direction and displays the same sequence of pre-defined data values in reverse order in response to the user tilting the accelerometer in a second direction.

5. The accelerometer-based user interface circuit of claim 1 wherein the mode selector means selects and displays a cycle of a sequence of pre-defined data values from a set of two or more stored pre-defined sequences of pre-defined data values, in response to the signal generated by the accelerometer.

6. The accelerometer-based user interface circuit of claim 1 wherein the display means is a 7-segment LED display.

7. The accelerometer-based user interface circuit of claim 1 configured as a Vehicle Performance Analyzer wherein the microprocessor means is programmed to first accept acceleration sensing data from the accelerometer and then calculate and display the time or distance covered during that acceleration.

8. The Vehicle Performance Analyzer of claim 7 wherein the microprocessor means is also programmed to calculate and display acceleration as G-forces experienced.

9. The Vehicle Performance Analyzer of claim 7 wherein the microprocessor means is also programmed to calculate and display the vehicle's elapsed time in moving from 0 to 60 miles per hour.

10. The Vehicle Performance Analyzer of claim 7 wherein the microprocessor means is also programmed to calculate and display the vehicle's elapsed time and maximum velocity in moving a quarter of a mile.

11. The Vehicle Performance Analyzer of claim 7 wherein the microprocessor means is also programmed to:

(a) cycle through and display a set of pre-defined numbers in response to the signal generated by the accelerometer;

(b) accept a number selected by the user, (c) use that number as the weight of the vehicle and calculate and display horsepower evolved during acceleration.

12. A method for entering data into an accelerometer-based user interface circuit, comprising the steps of:

(a) setting an accelerometer-based user interface circuit to a mode for cycling pre-defined data values for selection;

(b) tilting or otherwise moving said programmable acceleration-sensing device to cycle a sequence of pre-defined data values;

(c) observing the displayed values, and (d) entering one or more of the displayed values into the microprocessor means of the accelerometer.

13. The method of claim 12 wherein the user tilts the accelerometer in one direction to cycle the sequence of pre-defined data values and in a second direction to cycle the pre-defined data values in reverse sequence.

14. The method of claim 12 as wherein the user tilts the accelerometer in one direction to display a cycle of a sequence of pre-defined data values and tilts the accelerometer in a second direction to display a different sequence of pre-defined data values.

15. The method of claim 12 as wherein the user tilts the accelerometer in one direction to cycle the sequence of pre-defined data values and in another direction to cycle the another set of pre-defined data values in reverse order.

16. The method of claim 12 wherein the user tilts the accelerometer at different degrees of tilt to control the rate at which the sequence of pre-defined data values changes from one value to the next.

* * * * *